Patented Feb. 6, 1934

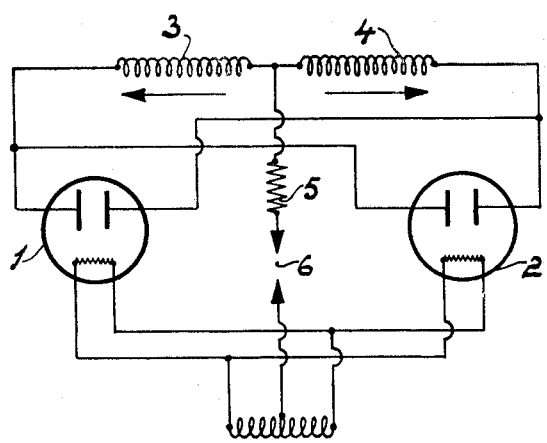

1,945,993

UNITED STATES PATENT OFFICE 1,945,993

ALTERNATING CURRENT RECTIFYING INSTALLATION

Johannes Gysbertus Wilhelm Mulder, Eindhoven, Netherlands, assignor to N. V. Philips' Gloeilampenfabrieken, Eindhoven, Netherlands, a limited-liability company of the Netherlands Application April 14, 1928, Serial No. 270,129, and in the Netherlands May 25, 1927

6 Claims. (Cl. 175—363)

This invention relates to an arrangement for the continuous maintenance of the operating functions of an installation, more particularly those of a rectifying installation.

It has long been known that in many installations of this kind, a lack of reliability in operation has been a serious drawback, due to the fact that the life of an incandescible cathode tube is limited in length, and to the further fact that when the tube ceases to function, the installation stops working. Such difficulties are especially serious, for example, in rectifying installations supplying the speech currents for an automatic central telephone exchange. In such case, it is imperative that the installation should not stop working, and as a rule expensive installations would afford a greater reliability of service. The more expensive installation would be preferred. The foregoing is true of many installations wherein neon tubes are employed for illumination or signalling purposes.

The present invention has for its object to provide an installation of simple constructions which, while affording greater reliability of service, is relatively inexpensive in cost.

According to the present invention, the installation is provided with at least two discharge tubes, the ignition voltages of which are higher than the operating voltages. Each tube preferably comprises an incandescible cathode and at least one anode, together with means for heating the incandescible cathodes. Each terminal of the alternating current source is connected with one one anode of each tube, a neutral point of the alternating current source being electrically connected to a conductor, which in turn connects the incandescible cathodes of the service tube.

Due to the fact that the ignition voltages of the tubes are higher than the operating voltages, as a consequence of which the discharge tubes have drooping current-voltage characteristic curves, only one tube will operate during the operation of the installation. However, as soon as the tube in operation ceases for any reason to function, a second tube is automatically set in operation. The explanation of this phenomenon will be given hereinafter.

The invention will be more clearly understood by referring to the accompanying drawing which represents by way of example a rectifying installation according to the invention.

In the drawing gas filled rectifiers are shown at 1 and 2, and comprise incandescible cathodes, preferably of the oxide type. Both rectifiers are adapted to rectify a two-phase alternating current, as a result of which each is provided with two anodes. Transformer coils 3 and 4 having their ends secured to the cathode and anode are connected in the manner clearly shown in the drawing. The arrows arranged immediately below the said coils and pointing in opposite directions, indicate the direction of current flow through the windings during two successive half waves of the alternating current.

In the circuit arrangement illustrated, the discharge paths of both rectifiers are connected in parallel and the tubes are provided with a common series resistance 5. A battery 6 to be charged may be connected to the rectifying installation in the manner shown.

Rectifiers of the said type have drooping characteristic curves whereby only one of the tubes connected in parallel can be traversed by current. Experience has shown that the tubes do not have exactly equal ignition voltages, so that one of the tubes, upon application of the ignition voltage, will be started before the other. At that time the tension across the tube connected in parallel falls to the value of the internal drop of the tube in operation, as a result of which ignition of the said second tube is impossible so long as the first tube is operating. Even if the tubes prove to have the same ignition or operating voltage, the two tubes, being connected in parallel, would operate in an unstable condition, after simultaneous ignition, so that after a short time only one tube would remain in operation. If for any reason the first rectifier ceases to function, the full transformer voltage is applied across the second rectifier, whereby the latter starts functioning, and no hiatus exists in the operation of the rectifying installation. It is evident that in order to enhance the reliability of operation, a larger number of rectifiers than two may be connected in parallel.

It is obvious from the foregoing that the invention is susceptible to numerous modifications and exemplifications without departing from the spirit of the invention, and it is intended that it be limited only by the scope of the appended claims.

I claim:

1. A rectifying system for alternating currents, comprising a source of alternating current, a load, two gasfilled rectifier tubes, the ignition voltages of which are higher than the operating voltages, each tube comprising an anode and an incandescible cathode, and a circuit including a source of alternating current, the load, and the two tubes in parallel connection, those electrodes of the two said tubes which have the same characteristics being connected together, only one of said tubes being in operation at a time, the other tube coming into operation upon the failure of the first tube.

2. A rectifying system for alternating currents, comprising a source of alternating current, two gasfilled rectifier tubes, the ignition voltages of which are higher than the operating voltages and the ignition voltage of one of the tubes being slightly different from that of the other, each tube comprising an anode and a cathode, the two tubes being in parallel connection with each other, the anodes and the cathodes of the two tubes being respectively and directly connected to each other, only the tube of lower ignition voltage being in operation until the failure thereof.

3. A rectifying system for alternating currents, comprising a source of alternating current, a load, two gasfilled rectifier tubes, the ignition voltages of which are higher than the operating voltages and the ignition voltage of one of the tubes being slightly different from that of the other, each tube comprising an anode and an incandescible cathode, and a circuit including the source of alternating current, the load, and the two tubes in parallel connection, the anodes and the cathodes of the two tubes being respectively and directly connected to each other, only the tube of lower ignition voltage being in operation until the failure thereof.

4. A rectifying system for alternating currents, comprising a source of alternating current, a load, two gasfilled rectifier tubes, the ignition voltages of which are higher than the operating voltages, each tube comprising two anodes and an incandescible cathode, and a circuit including the source of alternating current, the load, and the two tubes in parallel connnection, one anode of each tube being connected to one terminal of the alternating current source and the other anode of each tube being connected to the other terminal of said source, said cathode being connected to a point having a potential intermediate that of the terminals of said supply source.

5. A rectifying system for alternating currents comprising two gasfilled rectifier tubes, the ignition voltages of which are higher than the operating voltages, each tube comprising two anodes and an incandescible cathode, and a transformer connected by one terminal to one anode of each of the tubes and by its other terminal to the other anode of each of the tubes, said transformer having an intermediate point connected to said cathode.

6. A rectifying system for alternating currents comprising a load, two gasfilled rectifier tubes, the ignition voltages of which are higher than the operating voltages, each tube comprising an incandescible cathode and two anodes, a transformer having a secondary connected by one terminal to one anode of each of the two tubes and by its other terminal to the other anodes of each of the tubes, and a heating transformer, the secondary of which is connected across the incandescible cathodes, said secondary members having midpoints which are interconnected through the load.

JOHANNES GYSBERTUS
WILHELM MULDER.